No. 649,082. Patented May 8, 1900.
J. F. H. STAHLE.
FILTER.
(Application filed Feb. 17, 1899.)
(No Model.)
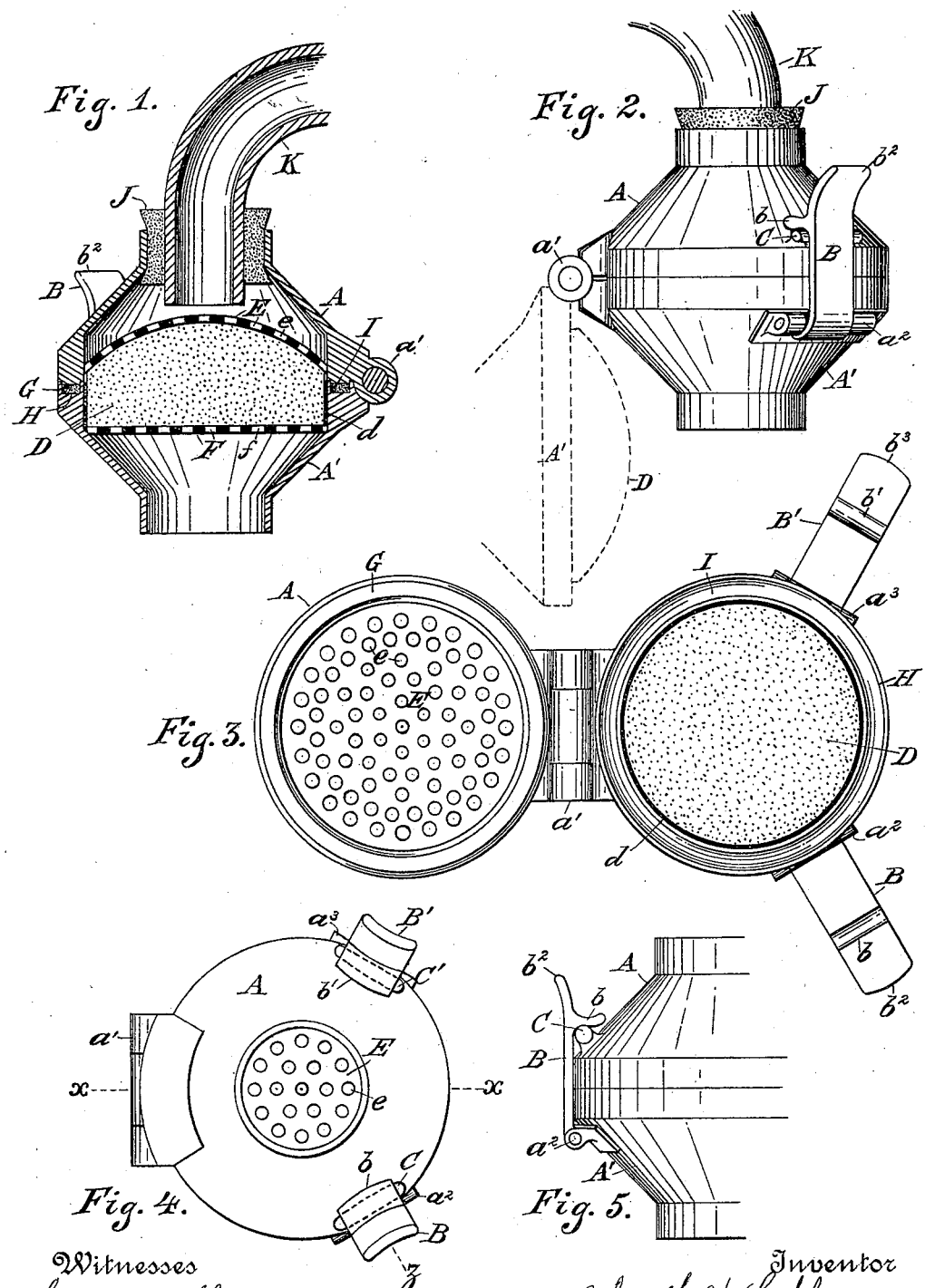
Witnesses
Geo. W. Ueffinger.
Inventor
John F. H. Stahle.

United States Patent Office.

JOHN FREDERICK HERMAN STAHLE, OF BERKELEY, CALIFORNIA.

FILTER.

SPECIFICATION forming part of Letters Patent No. 649,082, dated May 8, 1900.

Application filed February 17, 1899. Serial No. 705,914. (No model.)

*To all whom it may concern:*

Be it known that I, JOHN FREDERICK HERMAN STAHLE, a citizen of the United States, residing at Berkeley, in the county of Alameda and State of California, have invented a new and useful Improvement in Filters, of which the following is a specification.

My invention relates to an improvement in the ordinary portable water-filter loosely connected to the usual water-cock or faucet used in the domestic water-service.

It consists, essentially, in a filtering material or composition inclosed in an exterior shell or casing, said shell or casing being divided into an upper and lower water-tight compartment hinged and clamped together, the upper compartment adapted to connect readily to any ordinary faucet or cock and the lower compartment containing the filtering material, and also other details of construction more fully described hereinafter.

The object of my improvement is to provide a filter which can be almost instantly cleansed or renewed whenever necessary with the least amount of time, trouble, and expense. I attain this object by means of the device shown in the accompanying drawings, in which—

Figure 1 is a cross-section through $x\ x$ of Fig. 4. Fig. 2 is a full view of Fig. 1, showing open position of lower half of filter in dotted lines. Fig. 3 is a reverse plan of upper and lower sections of filter along the line of the hinge when fully swung open. Fig. 4 is a plan of Fig. 2. Fig. 5 is a full view of a portion of Fig. 1 along the line Z of Fig. 4.

Similar letters refer to similar parts in the different views.

A A' are a divided casing or body of any suitable non-corroding material; $a'$, a hinge on casing; B B', locking-clamps hinged at $a^2 a^3$ on casing A'; $b\ b'$, projections on B B'; C C', lugs on casing A; $d$, an annular layer of cement between filtering material D and casing A'; E F, perforated diaphragms or screens on top and bottom, respectively, of filtering material D; $e f$, perforations in E and F; G, an annular raised face in A; H, an annular groove in A'; I, a rubber gasket or suitable packing material in annular groove H; J, a rubber thimble or packing-ring fitting tightly in top opening in A; K, a faucet.

The operation of my device is self-evident. The filter, as shown closed in Figs. 1 and 2, is passed up the nozzle part of faucet K as far as practicable through the opening in thimble J, fitting closely and tightly thereon, and the filter is then ready and in use for operation.

Should it become necessary or convenient to use the supply of water from the faucet without the operation of filtering, thereby allowing the water to flow out more rapidly and expeditiously, the clamps B B' are forced outward at their upper ends $b^2\ b^3$, releasing them from the lugs C C', thereby allowing A' (the lower half of the divided casing or body of the filter containing the filtering material) to swing downward through its hinge connection $a'$ at a right-angle position to A, (the upper half of casing or body stationary on faucet,) as shown by the dotted lines in Fig. 2. Also in this position and operation the cleansing or renewing of the filtering material can be speedily and easily accomplished, as it is entirely exposed to allow for its renovation when necessary.

The annular layer of cement $d$ serves to make a tight fit between the filtering material and the casing A, guarding against leakage of unfiltered water.

The upper perforated diaphragm or screen E, fastened rigidly around the inside of the upper casing A, serves to protect the upper surface of the filtering material, at the same time allowing the water to pass through, its arched shape allowing the water to spread freely and quickly over the whole surface of the filtering material.

The lower perforated diaphragm or screen F is either loosely placed or rigidly fastened around the inside of the lower casing A' and serves to support and protect the bottom of the filtering material.

The annular-raised face and groove G and H form a male and female joint between the upper end and lower casings A and A', and the rubber gasket or packing I in groove H serves to make a tight fit to said joint when filter is closed and in operation.

Having now described my invention, what I claim as new, and desire to secure by Letters Patent, is—

In a filter, the combination of the divided casing, A A', of suitable non-corroding material and its hinge a'; hinged locking-clamps B B' and their projections b b'; lugs C C'; filtering material D and its annular layer of cement d; perforated diaphragms or screens E F; annular raised face G; annular groove H, with its rubber gasket I; and thimble J; substantially as and for the purpose herein described.

JOHN FREDERICK HERMAN STAHLE.

Witnesses:
GEO. W. UFFEINGER,
HARRY J. LASK.